United States Patent [19]

Ramer

[11] 4,140,979
[45] Feb. 20, 1979

[54] SOLAR PULSER FOR LASER PUMPING

[76] Inventor: James L. Ramer, 1432J Big Bend Rd., Waukesha, Wis. 53186

[21] Appl. No.: 810,230

[22] Filed: Jun. 27, 1977

[51] Int. Cl.² ............................................... H01S 3/091
[52] U.S. Cl. .................................. 331/94.5 P; 350/272
[58] Field of Search .................... 331/94.5 D, 94.5 P; 350/266, 272, 273–275

[56] References Cited
U.S. PATENT DOCUMENTS

| | | | |
|---|---|---|---|
| 3,732,505 | 5/1973 | Freedman | 331/94.5 P |
| 4,001,704 | 1/1977 | Danielmeyer et al. | 331/94.5 P |

Primary Examiner—William L. Sikes
Attorney, Agent, or Firm—Thomas O. Maser

[57] ABSTRACT

Apparatus for providing solar energy to the side of a longitudinally extending laser in pulses comprising a first cylindrical opaque body having a central cylindrical bore in which the laser is mounted, the body having longitudinal passages extending radially outwardly from the central bore. The body is mounted for rotation on its longitudinal axis within a second, non-rotating longitudinally extending opaque body, the second body also having longitudinally and radially extending passages. The outer ends of the passages in the second body are provided with focusing lenses, and mirrors are pivotally mounted on the exterior of the second body to direct sun light into the passages thereof. The laser may be fixed to and rotate with the first inner body, or may be fixed relative to the outer body, and not rotate.

13 Claims, 3 Drawing Figures

SOLAR PULSER FOR LASER PUMPING

BACKGROUND OF THE INVENTION

The present invention relates to apparatus for exciting lasers by solar energy, and more particularly to the excitation of the laser by exposing its side surface to pulsing solar energy.

Lasers are known to require radiant energy input in order to excite them, and various suggestions have been made in the prior art to effect the energy input.

In a number of prior suggestions, flash lamps of various types have been used, thereby requiring the input of energy to the flash lamps. Thus, such proposals have been relatively energy-consuming and therefore costly to operate.

In another proposal, a rotating body was provided having semiconductor lasers on the sides, and laterally of the rotating body a diode laser was provided for excitation of the lasers on the rotating body. While the diode lasers did not need to be pulsed, due to the rotation of the body mounting the lasers, nevertheless the arrangement was energy-consuming.

Another provision of the prior art provided for the lateral excitation of a longitudinally extending laser from a surrounding cold cathode electron emitter. Here again, a considerable energy consumption is required in a structure which is complex.

There have previously been proposed lasers which are pumped from solar energy, one, however, using an intermediate light emitting diode arrangement, thereby creating requirements for an electrical circuitry and the provision of the light emitting diode structure. In this arrangement, also, the laser was excited by the application of energy from the light emitting diode to the end face of a generally elongate or cylindrical laser rod. In another proposal, a solar pumped laser was end-fed, with a heat sink surrounding the laser rod-like body in order to effect heat transfer.

In addition, the prior art shows a solar side pumped laser construction.

SUMMARY OF THE INVENTION

The present invention provides a solar pulser for laser pumping, enabling radiant energy from the sun to be directed in pulsing fashion to the side of a laser, such as a laser rod body. The laser is supported within the bore of a central, generally cylindrical body which is of opaque material. The central body has a plurality of radially and axially extending passages, which extend between the central bore in which the laser is positioned, to the exterior of the body. This central body is caused to rotate by any suitable apparatus, and is housed within an outer body which has at least a generally semi-cylindrical portion that is provided with radially and axially extending passages. The circumferential width of the inner end of the passages of the outer body are substantially the same as the circumferential width of the outer ends of the passages of the inner body. The outer ends of the passages of the outer body are provided with focusing lenses. On the exterior of the outer body, adjacent the focusing lenses, are mirrors, pivotally supported so that their angles may be adjusted. The mirrors serve to direct the maximum amount of solar energy into and through the lenses, so that this solar energy is thereby directed through the passages in the outer body and thence through the passages in the inner body, when the passages are aligned, and to the laser. When the passages are not aligned, the solar energy is precluded from access to the laser, thereby providing for pulsing or pumping action of the solar energy on the laser.

The laser may be fixed to the inner body, so as to rotate with it, the inner body being supported by a bearing at either end which is in turn supported by an apertured end plate fixed to the outer body. Alternatively, the outer body may be provided with a stepped end plate secured to it, providing a shoulder for supporting a bearing, with the laser being fixed to the end plate, and the inner body rotating on the bearing, and thereby rotating relative to both the outer body and the laser.

Among the objects of the present invention are to provide a relatively simple arrangement for solar side pumping of a laser. Yet another object is to provide a solar pumping arrangement which will require minimal energy consumption for energy input to the laser. Yet another object is to provide a relatively simple laser pulsing arrangement in which maximum energy is delivered to the laser due to the side pumping thereof.

Other objects and many of the attendant advantages of the present invention will be readily understood from the following description, claims and drawings.

DESCRIPTION OF THE PREFERRED EMBODIMENTS

Figure 1:
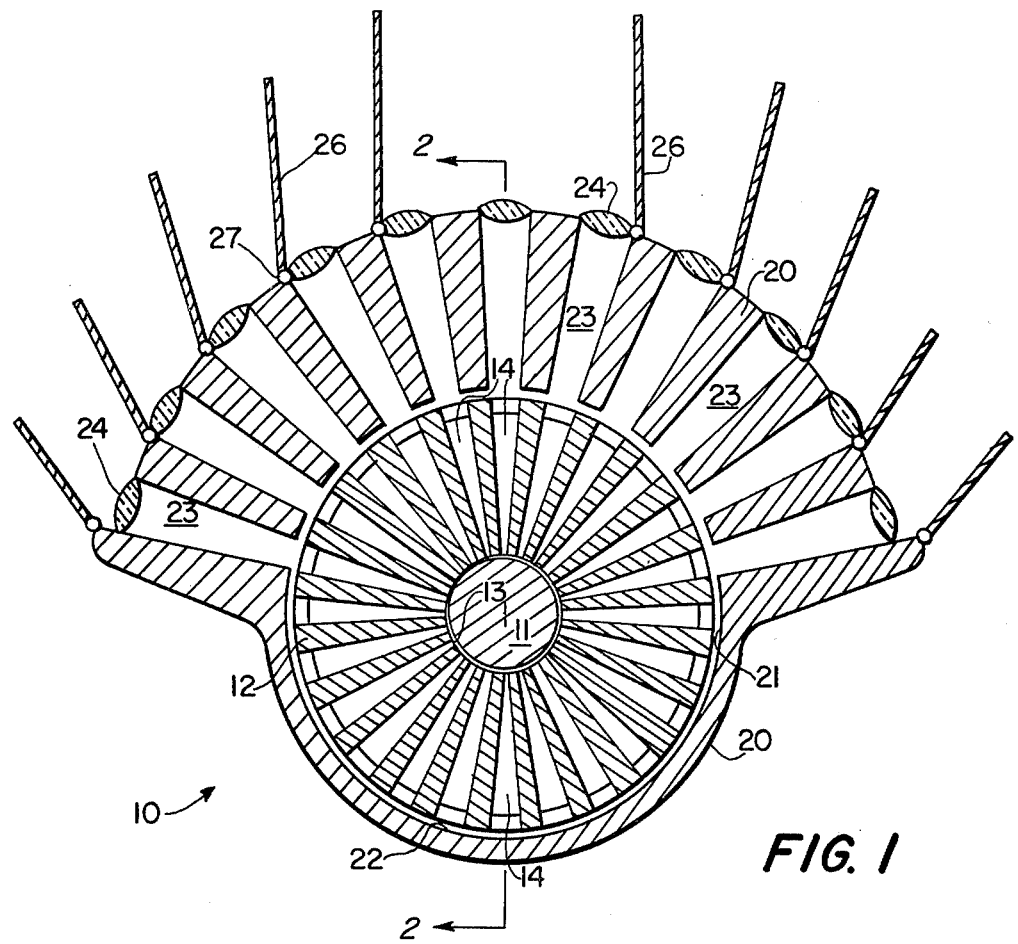
FIG. 1 is a transverse cross sectional view of a solar pulser for laser pumping in accordance with the present invention.

Referring now to the drawings, wherein like or corresponding reference numerals are used to designate like or corresponding parts throughout the several views, there is shown in FIG. 1 a transverse cross sectional view of a combination laser and solar pumper apparatus in accordance with the present invention, and generally designated 10. There are provided a laser in generally cylindrical rod-like form, designated 11, and a first, generally cylindrical body 12, which is opaque and which includes a cylindrical bore 13 in which the laser 11 is positioned. The first, inner body 12 is provided with a plurality of radially and axially extending passages 14 which extend from the bore 13 to the outer surface of the body 12.

The body 12 is within an outer body 20 which has an inner cylindrical surface 21 just outwardly of the outer surface of the inner body 12. The outer body 20 is, like inner body 12, opaque, and is for approximately 180°, imperforate, and in the form of a relatively thin shell. This shell portion is designated 22. The other portion of the body 20 has a relatively large radial extent, compared to the shell portion 22, and is provided with the passages 23 which extend radially and longitudinally through the body 20. The circumferential extent of the passages 23 at their inner ends is approximately the same as the circumferential extent of the passages 14 at their outer ends.

At the outer ends of the passages 23 in the outer body 20, there are provided the focusing lenses 24. Mirrors 26 are provided on the outer periphery of the outer body 20, connected to the body 20 by hinges 27 which extend, like the mirrors 26, in the axial direction. These hinges 27 serve to pivotally connect the mirrors 26 to the outer body 20, so that the positions of the mirrors 26 may be adjusted in order to direct the maximum amount of radiation from the sun into passages 23, after passing through the lenses 24.

It will be understood that the structure shown in FIG. 1 may be supported on a suitable carriage (not shown) which may be adjusted so that the inclination of the axis of laser 11, inner body 12 and outer body 20, which are, of course, coincident, may be to the extent possible perpendicular to the direct rays of the sun.

Figure 2:
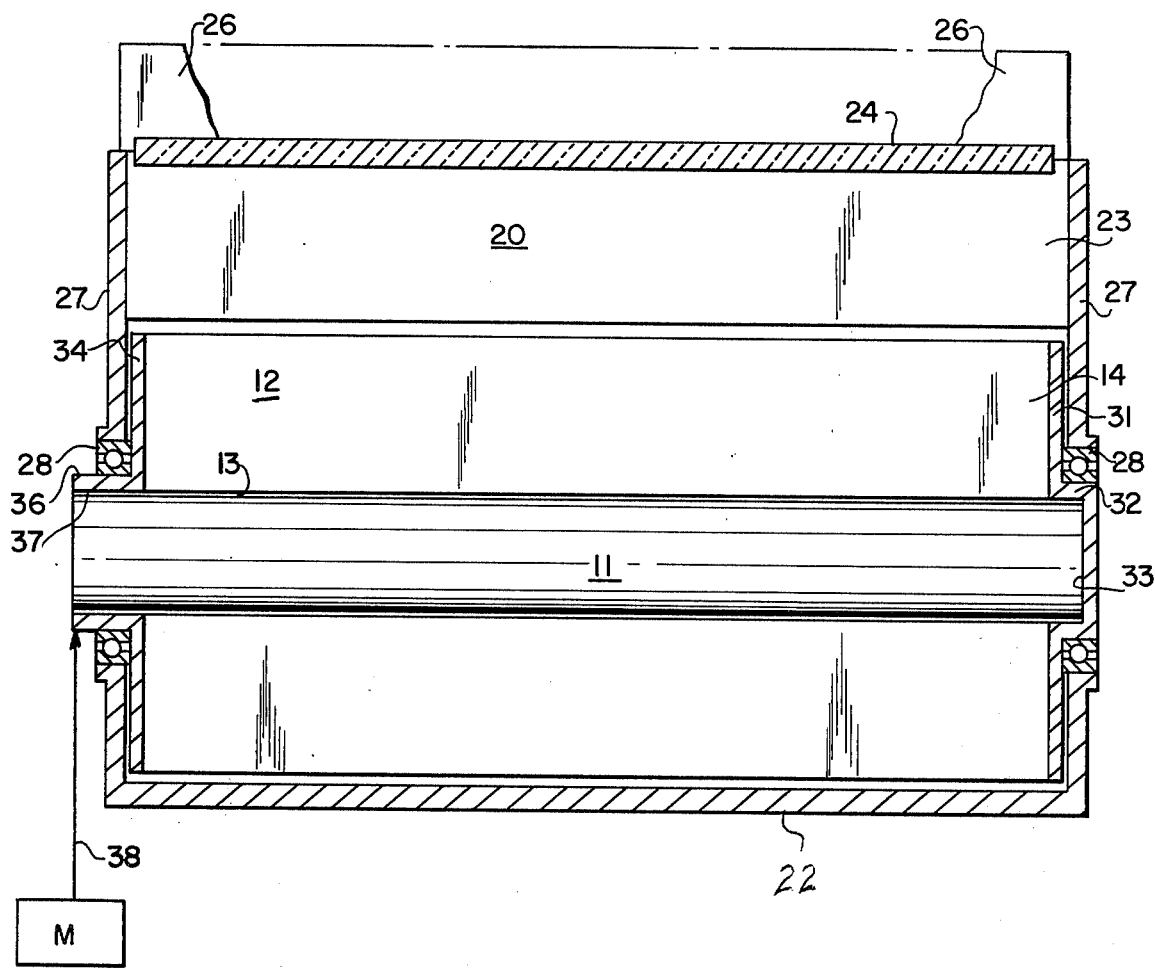
FIG. 2 is a cross sectional view taken on the line 2—2 of FIG. 1.

Referring now to FIG. 2, there may be seen the laser 11 which is located in the bore 13 of the inner body 12. Radially outwardly of the inner body 12 is the outer body 20, there being shown the shell portion 22 thereof at the bottom, and the portion opposite the shell portion 22 which includes the passages 23. The passages 23, as well as the passages 14 in the inner body 12, are provided with a light absorbing black surface, so that extraneous light does not act in a continuous manner and by reflection reach the laser 11 during periods when it is intended that the laser 11 not receive radiant energy. There are also shown in FIG. 2 a lens 24 and a mirror 26 (partially broken away).

On each end of the outer body 20 there is provided an apertured end plate 27, with anti-friction means 28, such as a bearing, carried in the apertures thereof. An end plate 31 of a stepped configuration is provided at one end of the inner body 12, being the right end as shown in FIG. 2. The end plate 31 is thereby provided with a shoulder 32 which engages the bearing 28, the end plate 31 having a disc portion 33 which engages one end of the laser 11. The laser 11 is secured to the body 12 by any suitable means, as by being wedged in the bore 13 of body 12, or by being secured to the disc portion 33 and shoulder 32 of end plate 31, which latter is, in turn, secured to the body 12 by any suitable means.

At the left end of FIG. 2, there is shown an end plate 34, which has an axially extending flange 36 at the inner periphery thereof, the inner surface of which engages a tubular extension 37 of the body 12. The exterior surface of the axially extending flange 36 engages the bearing 28. By this arrangement, the laser 11, body 12 and end plates 31 and 34 are rotatably supported in the bearings 28, and are rotatable as a unit relative to the end plates 27 and outer body 20. In order to rotate the aforementioned parts, including laser 11 and inner body 12, any suitable means may be provided. There is shown, by way of example, a motor designated M, suitably connected to the flange 36, by a connection 38. The connection 38 may be gearing, chain and sprocket, belt and pulley, or any suitable equivalent thereof for driving the inner body 12 and laser 11 rotatably, as enabled by the bearings 28.

Figure 3:
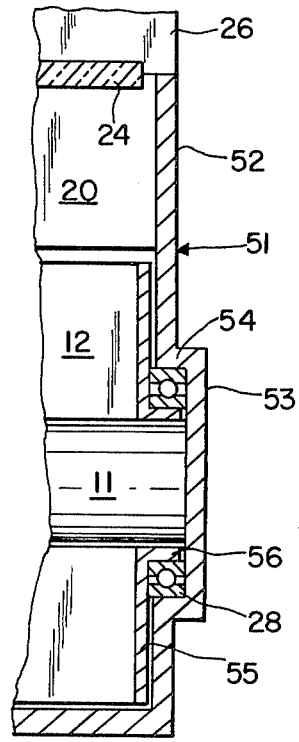
FIG. 3 is a partial view of an alternate embodiment of the solar pulser of the present invention.

Referring now to FIG. 3, there is shown an embodiment of the apparatus wherein the laser 11 does not rotate with the inner body 12. Thus, there is shown laser 11, inner body 12, outer body 20, lens 24 and a portion of mirror 26. In the embodiment of FIG. 3, the end plate 51 which is secured to the body 20 is of a stepped configuration, comprising the central disc 53 and an off-set surrounding annulus 52, the disc 53 and annulus 52 being joined by the shoulder 54. Internally, shoulder 54 carries a bearing 28, and an end plate 55 on the inner body 12 has an axial extension 56 which engages the bearing 28. Laser 11 is secured to the disc 53 of end plate 51, and since end plate 51 is secured to the outer body 20, it is apparent that the laser 11 will not rotate with the inner body 12, but will remain fixed relative to the outer body 20. Rotation of inner body 12 may be by suitable means, such as shown in FIG. 2.

Various construction features, known in the art, may be utilized in providing the structure as hereinabove set forth, and as disclosed in the drawings hereof. Thus, the inner surface of the shell portion 22 of the outer body 20 may be made reflective, as well as the inner surface of the disc portion 33 and 53. This will enhance the energy transference into the laser 11. Laser 11 may be either of the crystal or gas type, both well known in the art. The utilization of hermetic sealing and the drawing of a vacuum within the inner and outer bodies 12 and 20 may be necessary and/or desirable in certain instances, as where the rotational speed of inner body 12 exceeds or approaches the speed where the sheering of air internal to the device is critical. As will be apparent, this will require that substantially air tight seals be provided at all openings between the interior and the exterior of the device. In addition, it is contemplated that cooling of the device may be provided, and this could either be by liquid or gas, such as air. For example, there may be passages provided within the bodies 12 and 20 for the circulation of a cooling fluid; alternatively, air cooling may be effected by use of a flowing air stream across the device, with the bodies 12 and 20 being conductive so as to permit dissipation of heat in this manner. Further, the present apparatus may be operated in a vacuum; in that instance, both liquid and air coolants may be used.

In operation, the entire device is supported on a carriage so that, for example, the central one of the lenses 24 is oriented so as to be substantially perpendicular to the direct rays of the sun. The light enters this central passage 23 directly through the lens 24, and enters the other passages 23 by reflection from mirrors 26. The inner body 12 is caused to be rotated, and either the laser 11 rotates with it as in the embodiment of FIGS. 1-2, or the laser 11 remains stationary, as in the embodiment of FIG. 3. In both cases, when the passages 14 are aligned with the passages 23, the solar energy will be passed to the laser 11, exciting it and causing it to have its usual output. It will be noted that initially, there will be the maximum amount of light entering the passages 14 from the passages 23, this being when the inner body 12 is in the position shown in FIG. 1: the outer ends of the passages 14 being of slightly lesser circumferential extent than the inner ends of the passages 23, due to the radiating character of passages 14 and 23. As the inner body 12 rotates from the position shown in FIG. 1 however, the portions of the body 12 between the passages 14 will come into alignment with the inner ends of the passages 23, and substantially block the entry of light into the passages 14 in the inner body 12 from the passages 23 in the outer body 20. There will be prevented cross over of light so that when it is intended to prevent the entry of light to the laser 11, this will be accomplished. This shutting off of the light from the laser 11 is accomplished due to the relative circumferential width of the outer ends of the segments of the body 12 lying between the passages 14 and the inner ends of the light passages 23 of the body 20.

It will be obvious to those skilled in the art that various changes may be made without departing from the spirit of the invention, and therefore the invention is not limited to what is shown in the drawings and described in the specification but only as indicated in the appended claims.

I claim:
1. In combination,
a laser,
a first, substantially cylindrical opaque body having a bore within which said laser is supported,
a second opaque body adjacent and radially outward from said first body,
means for rotating said first body relative to said second body,
said bodies having light transmitting passage means extending radially therethrough such that said passage means are alternately aligned for admitting light to said laser from a continuous external source and non-aligned for occluding light from said laser as said first body is rotated.

2. The combination of claim 1, wherein said laser is longitudinally extending, said bodies being of substantially the same length as said laser to thereby provide excitation energy along the entire length thereof.

3. The combination of claim 2, wherein said passage means in said bodies are longitudinally extending.

4. The combination of claim 3, and focusing lens means in said passage means of said second body.

5. The combination of claim 3, and reflector means on said second body for reflecting light energy into said light transmitting passage means.

6. The combination of claim 5, said reflector means comprising planar mirrors extending axially of said second body, and pivot means at the outer surfaces of said second body pivotally supporting said mirrors thereon.

7. The combination of claim 5, and focusing lens means in said passage means of said second body.

8. The combination of claim 1, said laser being fixed to and rotatable with said first body.

9. The combination of claim 8, and a pair of centrally apertured end plates fixed to said second body, at least one of said laser and first body extending into the said apertures.

10. The combination of claim 9, and anti-friction means positioned in the apertures of said end plates, and supporting said laser and first body.

11. The combination of claim 1, and means for supporting said first body for rotational movement in said second body, and means securing said laser to said second body.

12. The combination of claim 11, said last mentioned means comprising an end plate secured to said laser and to said second body.

13. The combination of claim 12, wherein said end plate comprises a central disc and an off-set surrounding annulus joined by a shoulder, said laser being secured to said central disc, anti-friction means carried by said shoulder, and supporting said first body.

* * * * *